(12) United States Patent
Yu

(10) Patent No.: US 12,368,766 B2
(45) Date of Patent: Jul. 22, 2025

(54) INCREASING QUALITY ASSOCIATED WITH AN AUDIO OUTPUT DURING A VIDEO CONFERENCE

(71) Applicant: Zoom Communications, Inc., San Jose, CA (US)

(72) Inventor: Chi-chian Yu, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 33 days.

(21) Appl. No.: 17/588,568

(22) Filed: Jan. 31, 2022

(65) Prior Publication Data

US 2023/0247077 A1   Aug. 3, 2023

(51) Int. Cl.
*H04L 65/80* (2022.01)
*H04L 65/403* (2022.01)

(52) U.S. Cl.
CPC ............ *H04L 65/80* (2013.01); *H04L 65/403* (2013.01)

(58) Field of Classification Search
CPC .............................. H04L 65/403; H04L 65/80
See application file for complete search history.

(56) References Cited

U.S. PATENT DOCUMENTS

| 6,453,336 | B1* | 9/2002 | Beyda ................. H04L 65/4046 709/224 |
| 8,229,134 | B2 | 7/2012 | Duraiswami et al. |
| 8,565,446 | B1 | 10/2013 | Ebenezer |
| 10,325,600 | B2 | 6/2019 | Mann et al. |
| 10,524,049 | B2 | 12/2019 | Tanaka |
| 10,674,260 | B1* | 6/2020 | Tanabian ............. H04R 29/005 |
| 2015/0181010 | A1* | 6/2015 | Bran .................... H04M 1/6066 455/557 |
| 2018/0063019 | A1* | 3/2018 | Martin .................... H04L 43/16 |
| 2021/0051298 | A1* | 2/2021 | Atkins ................... H04N 7/147 |

OTHER PUBLICATIONS

Geometry Calibration of Multiple Microphone Arrays in Highly Reverberant Environments, Axel Plinge and Gernot A. Fink, Department of Computer Science, TU Dortmund University, Dortmund, Germany, Feb. 20, 2015, 6 pages.

* cited by examiner

*Primary Examiner* — Amal S Zenati
(74) *Attorney, Agent, or Firm* — Young Basile Hanlon & MacFarlane, P.C.

(57) ABSTRACT

A client application associated with a communications system may connect to a video conference. During the video conference, a decrease in a quality associated with an audio output generated by the communications system may be detected. In response to detecting that the quality associated with the audio output has decreased, a change to the communications system may be determined to increase the quality associated with the audio output. The change may be applied to the communications system to increase the quality of further audio output generated by the communications system during the video conference.

20 Claims, 10 Drawing Sheets

INCREASING QUALITY ASSOCIATED WITH AN AUDIO OUTPUT DURING A VIDEO CONFERENCE

FIELD

This disclosure relates generally to communication management and, more specifically, to increasing quality associated with an audio output during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
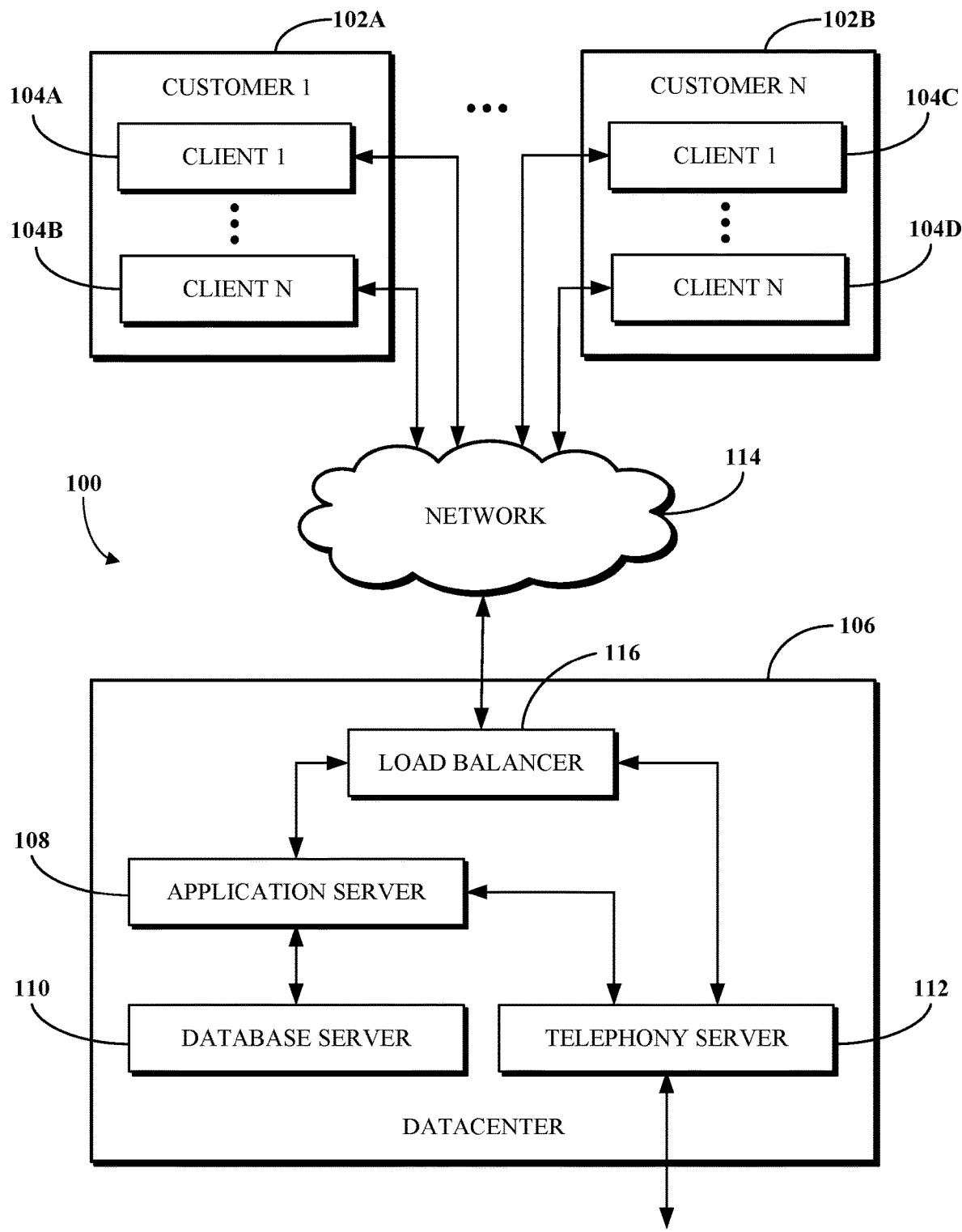
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

A software platform such as a UCaaS platform may permit video conferencing between participants at remote locations. During a video conference, audio is captured for the participants at their respective devices, processed at a server implementing conferencing software for the video conference, and then output to all participant devices for the users thereof to hear. In some cases, however, the quality of audio output for a given participant may decrease, such as based on user behaviors or issues with networks or components. Examples of user behaviors which can negatively affect audio quality include a participant moving further away from a microphone or changing directions so as to face away from a microphone. Examples of issues with networks or components which can negatively affect audio quality include a microphone losing battery power or a participant's network connection being interrupted. As a result of any such decrease in audio quality for a given participant, other participants in the video conference may not be able to hear the participant. While the subject participant may be able to take certain action in some cases to partially or wholly resolve the issue (e.g., by moving closer to the microphone or changing microphones), the participant may not realize that the quality associated with their audio output has decreased. As a result, the participant may have to repeat what was said one or more times. However, without a proper resolution of the underlying issues, this may cause difficulty and disruption for the participants of the video conference.

Implementations of this disclosure address problems such as these by providing a system that detects when a quality associated with an audio output has decreased during a video conference, determines a change to a communications system to increase the quality, and applies the change to the communications system. A participant of a video conference may execute a client application on their computing devices. The client application may be associated with a communications system that could include one or more microphones, speakers, and/or cameras. During a video conference, the client application may detect that a quality associated with an audio output generated by the communications system (e.g., using a microphone) has decreased. In some implementations, the client application may detect the decrease in quality by receiving an input sent by another participant. In some implementations, the client application may detect the decrease in quality by measuring the audio output and comparing the measurement to a threshold. In some implementations, the client application may detect the decrease in quality by measuring a performance of the network and comparing the measurement to a threshold. The client application may in any such case then determine a change to the communications system to increase the quality associated with the audio output. For example, the change could include adjusting a gain associated with one or more microphones and/or switching from one or more microphones to one or more other microphones. The client application may then apply the change to the communications system to increase the quality of further audio output generated by the communications system during the video conference. As a result, if a participant moves further away from a microphone or changes direction away from a microphone, or if a microphone loses battery power, or if a participant's network connection is interrupted, the system may detect such an event as a decrease in quality associated with the audio output being generated, the system may determine a change to increase the quality, and the system may apply the change.

To describe some implementations in greater detail, reference is first made to examples of hardware and software structures used to implement a system to increase quality associated with an audio output generated during a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
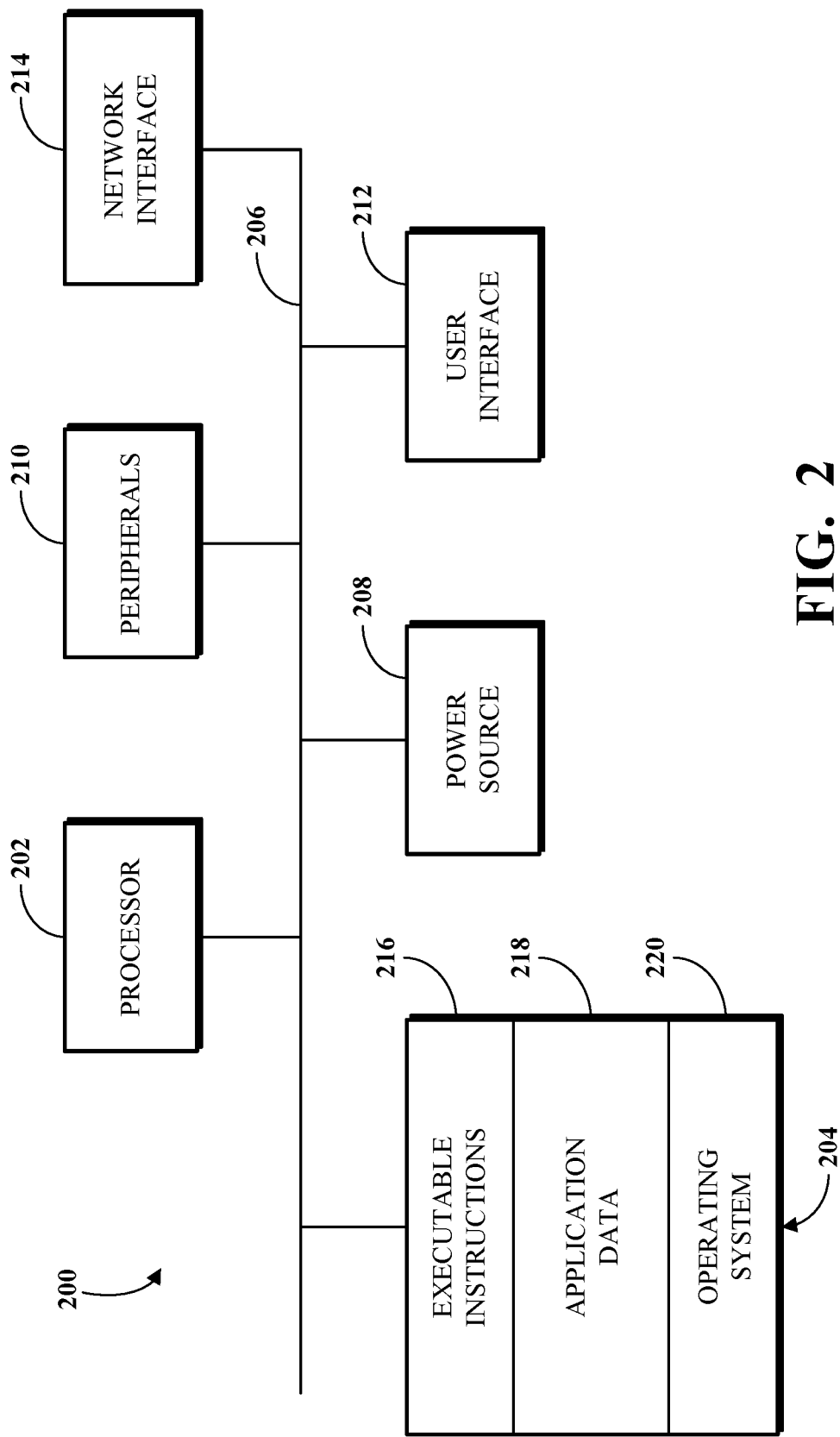
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
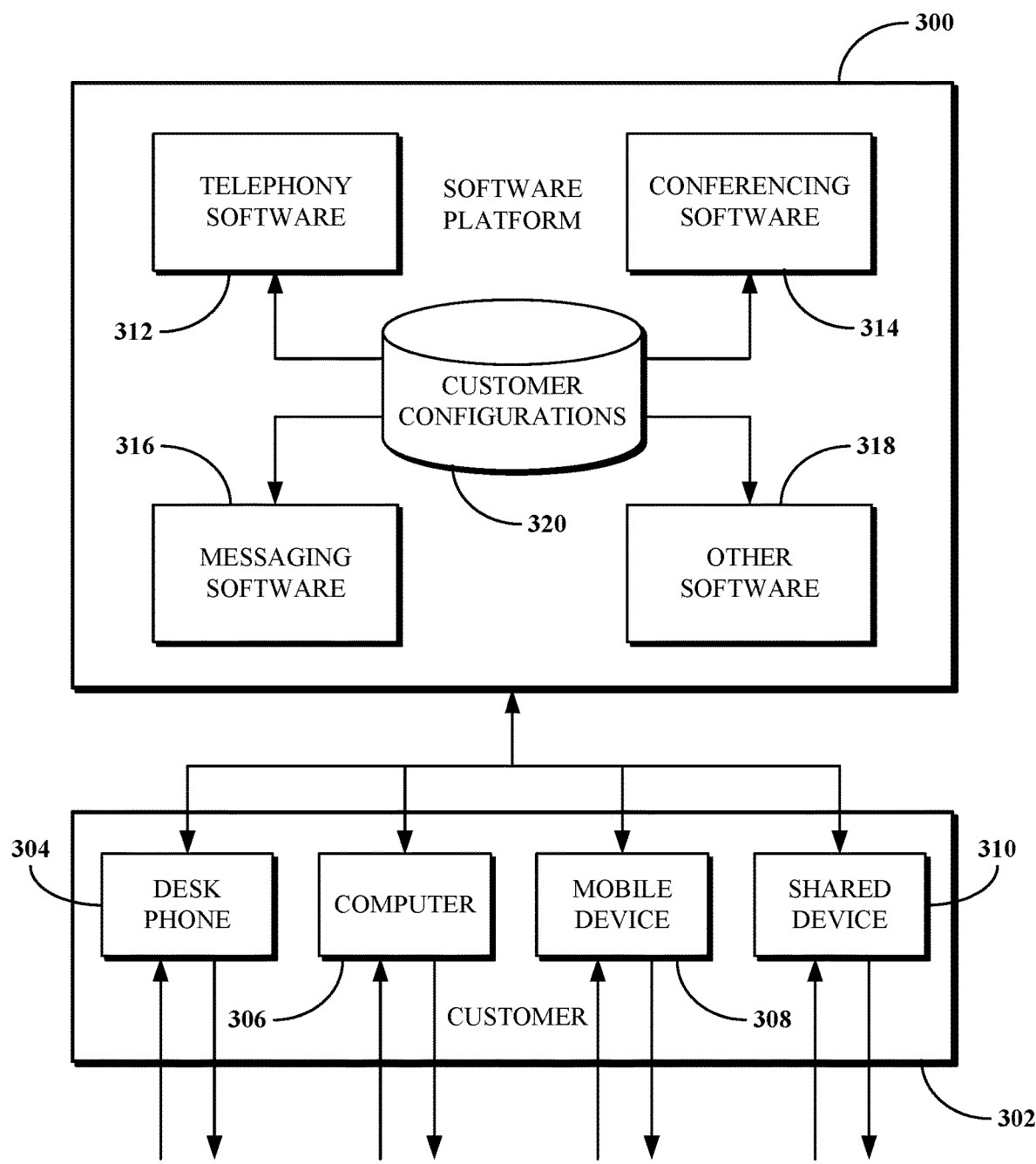
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include control software that permits detecting that a quality associated with an audio output has decreased during a video conference, determining a change to increase the quality associated with the audio output, and/or applying the change. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
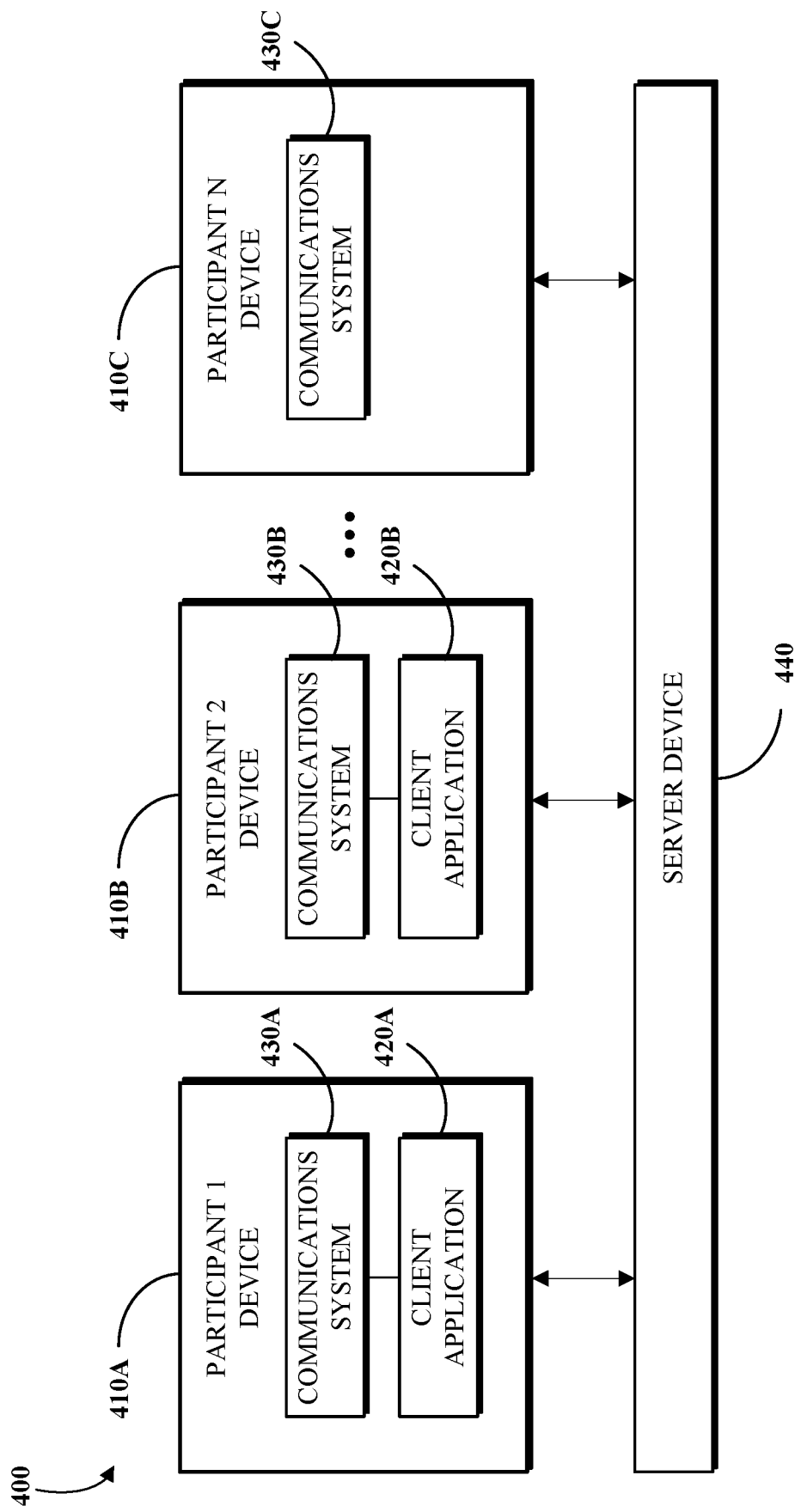
FIG. 4 is a block diagram of a system for increasing quality associated with an audio output during a video conference.

FIG. 4 is a block diagram of a system 400 for increasing quality associated with an audio output during a video conference. The system 400 may include one or more participant devices at remote locations, such as participant devices 410A through 410C. For example, a participant device could be a client device such as one of the clients 104A through 104D shown in FIG. 1. A participant device may execute software including a client application, such as participant device 410A executing client application 420A and participant device 410B executing client application 420B. The client application may be used to connect a participant device to a video conference which may include other participant devices. For example, the client application 420A may be used to connect the participant device 410A to a video conference, and the client application 420B may be used to connect the participant device 410B to the same video conference. In some implementations, a participant device may connect to the video conference by using conferencing software at a server (e.g., over a web application). For example, participant device 410C may connect to the video conference by using conferencing software at server device 440.

A participant device may also include a communications system, such as participant device 410A including communications system 430A, participant device 410B including communications system 430B, and participant device 410C including communications system 430C. A client application may use the communications system to communicate with other participants during a video conference, such as client application 420A using communications system 430A to communicate with participant devices 410B and 410C. A communications system may include one or more microphones, one or more cameras, one or more speakers, and/or one or more user interfaces. A communications system may generate an audio output via the one or more microphones and/or a video output via the one or more cameras. A communications system may also receive an audio input via the one or more speakers and/or a video input via the one or more user interfaces.

The one or more participant devices (e.g., participant device 410A through 410C) may connect to server device 440. The server device 440 may run software including conferencing software configured to support a video conference between participant devices. For example, the server device 440 could be a server at the datacenter 106 shown in FIG. 1. For example, the server device 440 may run conferencing software such as the conferencing software 314 shown in FIG. 3, and the participant devices 410A, 410B, and 410C may connect to the video conference over the conferencing software. In operation, participants may connect to a video conference via respective participant devices, such as participant devices 410A, 410B, and 410C. A participant device could be operated by single user (e.g., the participant) at a remote location. In some cases, a participant device could be shared by multiple participants.

During a video conference, an audio output generated by a communications system (e.g., communications system 430A) of a participant device (e.g., participant device 410A) could possibly decrease in quality. For example, if a participant associated with participant device 410A moves further away from a microphone of the communications system 430A, the participant changes direction away from the microphone, the microphone loses battery power, or the participant's network connection decreases in quality or is interrupted, the quality associated with the participant's audio output may decrease. As a result, other participants in the video conference, such as participants associated with participant devices 410B and 410C, may not be able to hear the participant experiencing the audio output that has decreased in quality (e.g., the participant associated with participant device 410A).

The system 400 accordingly may detect when a quality associated with an audio output is insufficient and/or has decreased during a video conference, determine a change to a communications system to increase the quality, and apply the change to the communications system. In some implementations, the change could include adjusting a gain associated with one or more microphones and/or switching from one or more microphones to one or more other microphones. For example, the client application 420A (executing on participant device 410A) may detect that the audio output generated by the communications system 430A (e.g., a microphone associated with participant device 410A) is insufficient and/or has decreased in quality. In response to detecting that the quality is insufficient and/or has decreased, the client application 420A may determine a change to the communications system 430A to increase the quality associated with the audio output. In some implementations, the change could include adjusting a gain associated with one or more microphones of the communications system 430A and/or switching from one or more microphones to one or more other microphones of the communications system 430A. For example, the client application may determine that a gain associated with one or more microphones should be increased. For example, the client application 420A may determine that the communications system 430A should switch from using a first microphone (e.g., further from the participant) to using a second microphone (e.g., closer to the participant). The client application 420A may then apply the change to the communications system 430A to improve the audio output. As a result, other participants in the video conference, such as participants associated with participant devices 410B and 410C, may be able to better hear the participant associated with participant device 410A during the video conference.

In some implementations, the client application (e.g., the client application 420A) may detect the decrease in quality by receiving an input sent by another participant device (e.g., receiving feedback). For example, the client application 420A (executing on participant device 410A) may detect that the quality associated with the audio output of the communications system 430A (associated with the participant device 410A) is insufficient and/or has decreased by receiving an indication from a client application 420B executing on participant device 410B. In some implementations, the client application (e.g., the client application 420B executing on participant device 410B) may provide a prompt on a user interface for a participant to select when the participant desires to provide such indication to the other participant (e.g., to the participant device 410A).

In some implementations, the client application (e.g., the client application 420A) may detect the decrease in quality by measuring the audio output of the communications system and comparing the measurement to a threshold (e.g., scoring). In such a case, the detection may be independent of input from another participant device. For example, the client application (e.g., the client application 420A) may detect the decrease in quality by measuring a mean opinion score (MOS) and/or signal to noise (SNR) for one or more microphones of the communications system 430A and comparing the measurement to a minimum acceptable performance level used as a threshold. If the measurement is below the threshold, the client application 420A may detect that the quality associated with the audio output is insufficient and/or has decreased such that a change to the communications system 430A should be made. The MOS and/or SNR can be determined by empirical modeling using audio captured at the subject participant device (e.g., the participant device 410A). Alternatively, the MOS and/or SNR can be determined by empirical modeling using audio capturing from multiple participant devices, such as by software running at the server device 440, in which the model may be made available to client applications such as the client application 420A. As a further alternative, the MOS and/or SNR can be determined using a machine learning model trained based on audio captured at one or more participant devices.

In some implementations, the client application (e.g., the client application 420A) may detect the decrease in quality by detecting that the participant's network connection is interrupted (e.g., between a participant device and the server device 440). For example, the client application may use one or more software tools to monitor network activity and/or statistics associated with the network, such as network bandwidth, throughput, latency, jitter, and/or error rate. Should the network connection be interrupted, the client application may pause the audio output until the network connection is restored.

In some implementations, the client application (e.g., the client application 420A) may detect the decrease in quality by using a camera of the communications system (e.g., the communications system 430A) to detect an orientation of the participant. For example, the client application may use the camera to detect whether a participant has moved further away from a microphone (e.g., has become smaller and/or has moved to one side in the image and therefore has become further from the microphone, and/or has turned in a direction facing away from the microphone). If the participant is detected to have moved further away from a microphone or turned in a direction facing away from the microphone, the client application (e.g., the client application 420A) may detect that the quality associated with the audio output is insufficient and/or has decreased such that a change to the communications system (e.g., the communications system 430A) should be made. For example, a video stream may be captured using a camera of the communication system (e.g., the communications system 430A). Object detection may then be used to determine how a participant looks in the video stream when audio quality is above a minimum acceptable performance level. For example, the object detection may be used to measure a percentage of the participant (e.g., the participant's face) that is visible within the video stream when the audio quality is above the minimum level (e.g., a minimum MOS and/or SNR). The object detection may then be used based on a change in audio quality to measure a change in the percentage of the participant (e.g., the participant's face) that is visible within a corresponding portion of the video stream. In another example, object detection may be used to determine the direction a participant is facing when audio quality is above a minimum acceptable performance level (e.g., a minimum MOS and/or SNR). The object detection may then be used based on a change in audio quality to measure a change in direction that the participant is facing (e.g., the participant's face) that is visible within a corresponding portion of the video stream.

In some implementations, the client application (e.g., the client application 420A) may use a machine learning model to detect the decrease in quality. For example, the client application (e.g., the client application 420A) may use a machine learning model to measure one or more microphones and compare each to a threshold.

In some implementations, the client application (e.g., the client application 420A) may determine the change by comparing the audio output associated with individual microphones of the communications system (e.g., the communications system 430A) and selecting one or more of the microphones based on the one or more microphones having audio outputs providing the best quality. In some implementations, the client application (e.g., the client application 420A) may determine the change by measuring the audio output associated with individual microphones of the communications system (e.g., the communications system 430A) and determining a gain level or setting usable with one or more of the microphones to improve the quality of audio captured thereby (e.g., a gain increase of one microphone and/or a gain decrease of another microphone). For example, the client application (e.g., the client application 420A) may measure an MOS and/or SNR for one or more microphones of the communications system (e.g., the communications system 430A). The client application may then compare the measurement of the one or more microphones to a minimum acceptable performance level used as a threshold. If the measurement is below the threshold, the client application 420A may adjust the gain of the one or more microphones (e.g., increase the gain) so that the measurement is above the threshold. The client application 420A may also switch from a first set of microphones to a second set of microphones based on the second set of microphones providing a greater MOS and/or SNR than the first set of microphones.

In some implementations, the client application (e.g., the client application 420A) may determine the change by using a camera of the communications system (e.g., the communications system 430A) to detect an orientation of the participant and by determining whether to adjust and/or select a microphone based on the orientation (e.g., increasing a gain of a microphone that has become further away from the participant and/or selecting a microphone that has become closer to the participant, as determined from the location of the participant). For example, a video stream may be captured using a camera of the communication system (e.g., the communications system 430A). Object detection may then be used to determine a location of the participant in a physical environment. For example, the object detection may be used to measure a percentage of the participant (e.g., the participant's face) that is visible within the video stream to determine a distance and/or angle of the participant from the camera. The client application may then reference a look up table corresponding to the physical environment to determine distances between the participant and the one or more microphones in the physical environment. The look up table may indicate the positions (e.g., the measured locations) of the one or more microphones and/or the camera in the physical environment, such as by indicating coordinates of the one or more microphones and/or the camera in three dimensions. Based on the distances, the client application may adjust the gain of one or more microphones (e.g., to increase the gain of a microphone with increased distance of a participant from the microphone) and/or to select between one or more microphones (e.g., to select a microphone that is closest to the participant). In another example, object detection may be used to determine the direction a participant is facing in the physical environment. The client application may then reference the look up table to adjust the gain of one or more microphones (e.g., to increase the gain of a microphone with an increase of a participant's turning away from the microphone) and/or to select between one or more microphones (e.g., to select a microphone in a direction in which the participant is facing).

In some implementations, the client application (e.g., the client application 420A) may determine the change by using one or more established models to evaluate values obtained from the network (e.g., between the participant device 410A and the server device 440) that may be representative of the performance of the network. The one or more established models may have been empirically determined. For example, the client application 420A executing on the participant device 410A may use a model associated with a Wi-Fi connection, a model associated with a Cellular connection, and/or a model associated with a Dial-In connection to evaluate values obtained from the network (e.g., between the participant device 410A and the server device 440). The client application 420A may then determine whether to switch to a Wi-Fi connection or a Cellular connection or a Dial-In connection based on the evaluation. For example, if the communications system 430A includes only one operable microphone, the client application 420A may determine the change to involve a change in the network connection (e.g., to a different network modality), as opposed to a change to another microphone. In some implementations, the one or more established models may be used to determine whether the performance of the network is within one or more ranges, such as a first range indicating a good connection (e.g., green), a second range indicating a questionable connection (e.g., yellow), and a third range indicating a poor connection (e.g., red). For example, performance of the network in the second range and/or the third range may result in a determination to change network modalities. In some implementations, the one or more established models may be specific to a geographic location of a participant. For example, a client application 420A executing on participant device 410A in a first geographic location may reference a first set of one or more models specific to the first geographic location (e.g., when evaluating the network) while a client application 420B executing on participant device 410B in a second geographic location may reference a second set of one or more other models specific to the second geographic location (e.g., when evaluating the network). In some implementations, the client application (e.g., the client application 420A) may evaluate the network after measuring and/or comparing the performance of one or more microphones. For example, this may permit the participant device to conserve resources by reducing the number of calculations to perform when evaluating the network.

In some implementations, the change determined based on the detected decrease in audio quality can include invoking text to speech and/or speech to text software. For example, the client application (e.g., the client application 420A) may determine that the quality of the audio output is insufficient and/or has decreased such that a computer generated audio output may be better than the audio output generated by the communications system 430A. For example, the client application 420A may prompt the participant to begin entering text instead of speaking, such as by typing into a video conference chat box shared with other participants or another messaging environment. The client application 420A may then invoke text to speech software to transpose the text to computer generated audio that is sent as the audio output to the other participants in the video conference. In some implementations, the text may be sent to other participant devices in the video conference, and in some implementations, the client applications of the other participant devices may invoke text to speech software to transpose the text to the computer generated audio.

During a video conference, a participant's audio stream and/or video stream may be associated with a user tile for the participant that is displayed to a user interface. A video conference involving multiple participants may have multiple user tiles with each providing audio streams and/or video streams for a participant. In some implementations, when invoking the text to speech and/or speech to text software, the text and/or the computer generated audio may be associated with a same user tile in a user interface as was previously associated with the participant. For example, when the client application (e.g., the client application 420A) determines that the quality of the audio output associated with a user tile is insufficient and/or has decreased, the client application may invoke the text to speech and/or speech to text software for the user tile without creating a new user tile.

In some implementations, the client application (e.g., the client application 420A) may determine that the communications system (e.g., the communications system 430A) is functioning sufficiently while the network is possibly functioning with difficulty. The client application 420A may invoke speech to text software and may prompt the participant to continue speaking while the communications system 430A is used to transcribe the speech to text (e.g., dictating). The client application 420A may then invoke text to speech software to transpose the text to computer generated audio that is sent as the audio output to the other participants in the video conference. In some implementations, the text may be sent to other participant devices in the video conference, and in some implementations, the client applications of the other participant devices may invoke text to speech software to transpose the text to the computer generated audio.

In some implementations, the client application (e.g., the client application 420A) may continuously execute to determine a change to improve the audio output, including when changes in environmental conditions occur (e.g., further movement by the participant, changes in network conditions, and/or changes in the communications system, such as the communications system 430A). In some implementations, the client application (e.g., the client application 420A) may determine that the video conference should be restarted (and may send to the display a message to the user interface and/or play a message via the speaker indicating that the video conference should be restarted). For example, the client application 420A may generate a message indicating that the participant should restart the network connection, change from one network connection to another (e.g., from Wi-Fi to Cellular), hang up and dial back in, or the like.

In some implementations, the client application (e.g., the client application 420A) may use a machine learning model to determine the change. For example, the client application 420A may use a machine learning model to measure one or more microphones and determine whether to adjust the gains of the one or more microphones and/or switch to one or more other microphones. For example, the client application 420A may use a machine learning model to measure network performance and determine whether to switch to another network modality (e.g., Wi-Fi, Cellular, Dial In).

In some implementations, the client application (e.g., the client application 420A) may provide an alert to the participant. For example, the client application 420A may cause a message to be displayed to a user interface and/or cause a message to be played via a speaker. In some implementations, the message may indicate the determined change (e.g., as a recommendation) to the participant without first applying the change. This may allow the participant to manually make the change, approve the change before it is applied, and/or reject the change before it is applied. The client application (e.g., the client application 420A) may be configured to detect when a change according to a recommendation within an alert has been made. In some implementations, the client application (e.g., the client application 420A) may automatically apply the change at a predetermined time after providing the alert to the participant. In some implementations, the client application (e.g., the client application 420A) may automatically apply the change without providing any alert at all to the participant.

Figure 5:
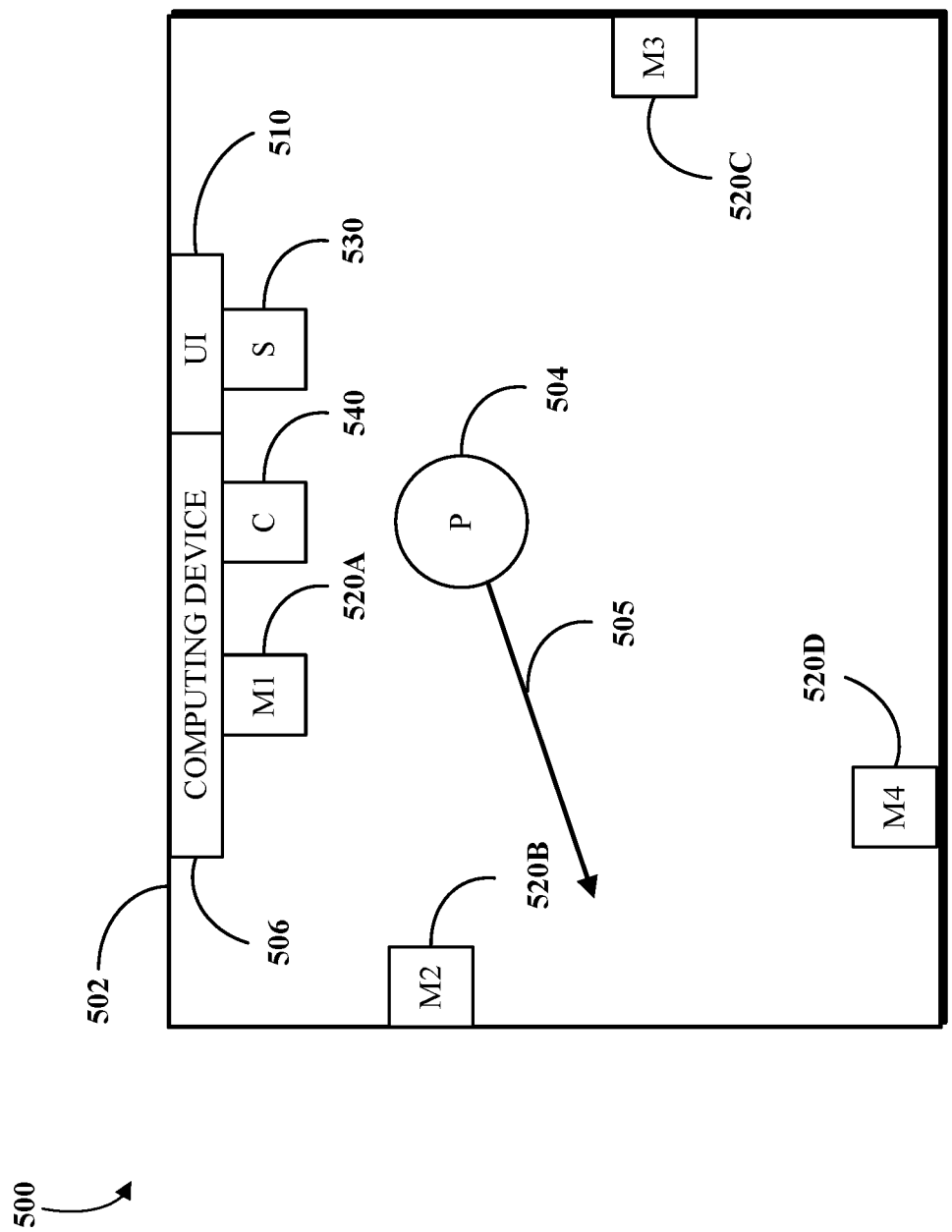
FIG. 5 is a block diagram of an example of a physical environment including a communications system for video conferencing.

FIG. 5 is a block diagram of an example of a physical environment 500 including a communications system for video conferencing. In a physical space 502, such as an office, meeting room, classroom, or similar environment, a participant 504 or user may use a computing device 506 to execute a client application to connect to a video conference. For example, the computing device 506 could be like a participant device executing a client application as shown in FIG. 4 (e.g., participant device 410A). The computing device 506 may use the communications system in the physical space 502 to communicate with other participants during the video conference. For example, the communications system in the physical space 502 could be like a communications system shown in FIG. 4 (e.g., communications system 430A).

The communications system may include one or more microphones, cameras, speakers, and/or user interfaces. For example, the communications system may include a user interface 510 (e.g., a video display), a first microphone 520A, a second microphone 520B, a third microphone 520C, a fourth microphone 520D, a speaker 530, and a camera 540. The one or more microphones, cameras, speakers, and/or user interfaces could be implemented in the physical space 502 as separate devices and/or as devices integrated with one another (e.g., a microphone, camera, and speaker integrated with a monitor; a microphone, camera, and speaker integrated with a laptop; a microphone, camera, and speaker integrated with a docking station; and/or microphone and speaker integrated with a wireless headset). The one or more microphones, cameras, speakers, and/or user interfaces could also be implemented by one or more other computing devices connected in the physical space 502 (e.g., a laptop, a smartphone).

The communications system may be distributed in the physical space 502. For example, the user interface 510, the first microphone 520A, the speaker 530, and the camera 540 may be located at a front of the physical space 502 (as generally oriented by the participant); the second microphone 520B may be located on a left side of the physical space 502 (and more toward the front); the third microphone 520C may be located on a right side of the physical space 502 (and more toward the back); and the fourth microphone 520D may be located at a back of the physical space 502 (and more toward the left side). In some implementations, the communications system may be distributed in the physical space 502 based on the acoustics of the physical space 502. In some implementations, the communications system may be distributed in the physical space 502 as suggested by a machine learning model of the client application.

During a video conference, the audio output generated by the communications system (e.g., one or more of the microphones) could possibly decrease in quality. For example, if the participant 504 is using the first microphone 520A (e.g., which could be configured as a default microphone) and moves further away from that microphone or changes direction away from that microphone (e.g., as indicated by arrow 505), or if that microphone loses battery power, the quality associated with that participant's audio output may decrease. As a result, other participants in the video conference may not be able to hear the participant 504. The computing device 506 may execute the client application to detect that the quality associated with the audio output has decreased (e.g., the quality associated with the audio output generated by the first microphone 520A has decreased), to determine a change to the communications system to increase the quality (e.g., adjust the gain of the first microphone 520A and/or switch to the second microphone 520B), and to apply the change to the communications system to improve the audio output during the video conference.

In some implementations, the client application may detect the decrease in quality by measuring the audio output of the communications system and comparing the measurement to a threshold (e.g., scoring). For example, if the participant 504 is using the first microphone 520A and moves further away from that microphone or changes direction away from that microphone, or if the first microphone 520A loses battery power, the client application may detect a decrease in quality by detecting a decrease in an MOS and/or SNR associated with the first microphone 520A. In some implementations, the client application may continuously measure and/or monitor an MOS and/or SNR for one or more microphones in the system, including the first microphone 520A. In some implementations, the client application may compare the MOS and/or SNR of a microphone to a threshold (e.g., compare the first microphone 520A to the threshold) and/or to other microphones (e.g., compare the first microphone 520A to the second microphone 520B). The client application may then determine a change based on the comparison, such as adjusting a gain of a microphone based on the MOS and/or SNR (e.g., increasing the gain of the first microphone 520A, and increasing the gain of the third microphone 520C), and/or selecting one or more other microphones to use based on the MOS and/or SNR (e.g., selecting the second microphone 520B).

In some implementations, the client application may determine the change by using the camera 540 to detect an orientation of the participant 504 and adjust and/or select a microphone based on their orientation (e.g., detecting in an image from the camera 540 that the participant 504 has moved closer to the left side of the room and selecting the second microphone 520B and/or increasing the gain of the first microphone 520A). In some implementations, the client application may use a machine learning model to detect the decrease in quality associated with the audio output (e.g., measuring and comparing the audio output of the one or more microphones to a threshold) and/or to determine the change to increase the quality (e.g., adjusting the gains of one or more microphones and/or selecting between one or more microphones based on measuring and comparing the audio output of the one or more microphones to one another).

Figure 6:
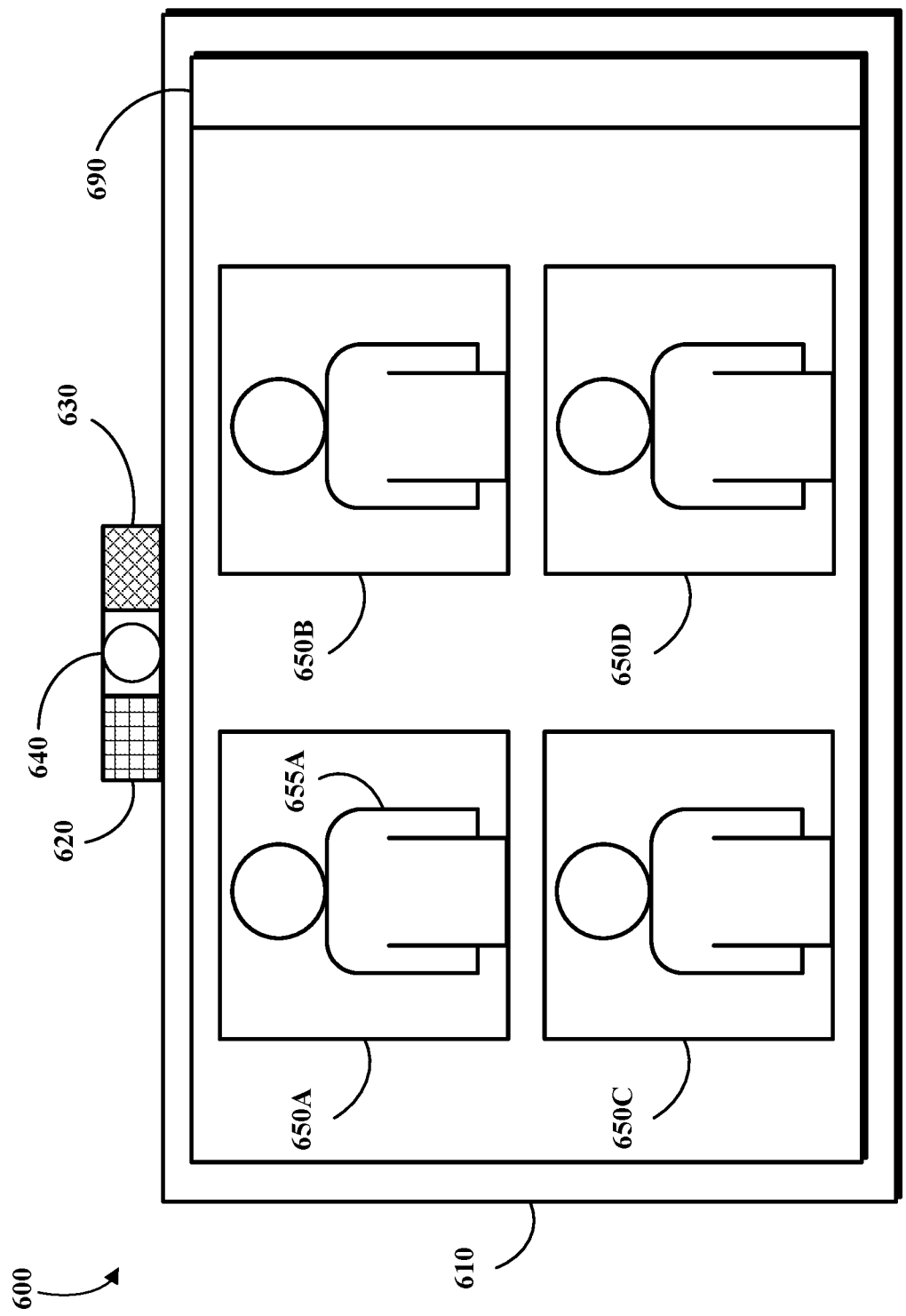
FIG. 6 is an illustration of an example of a communications system associated with a participant device.

FIG. 6 is an illustration of an example of a communications system 600 associated with a participant device. The communications system 600 may include a user interface 610, a microphone 620, a speaker 630, and a camera 640. The communications system 600 could be like the communications system shown in FIG. 5. For example, the user interface 610, the microphone 620, the speaker 630, and the camera 640 could be like the user interface 510, the first microphone 520A, the speaker 530, and the camera 540 shown in FIG. 5. A computing device associated with the communications system 600, like the computing device 506 shown in FIG. 5, may execute a client application, like the client application 420A shown in FIG. 4. The user interface 610 may display user tiles associated with participants of a video conference, such as user tiles 650A through 650D. For example, the user tiles 650A through 650D could correspond to participants of participant devices like the participant devices shown in FIG. 4. For example, the communications system 600 could belong to participant 655A shown in the user tile 650A. During a video conference, participant 655A may send an audio output to other participants via the microphone 620 and may receive an audio input from other participants via the speaker 630. Further, participant 655A may send a video output to other participants via the camera 640 (e.g., as represented by the user tile 650A) and may receive a video input from the other participants via the user interface 610 (e.g., as represented by the user tiles 650B through 650D).

Figure 7:
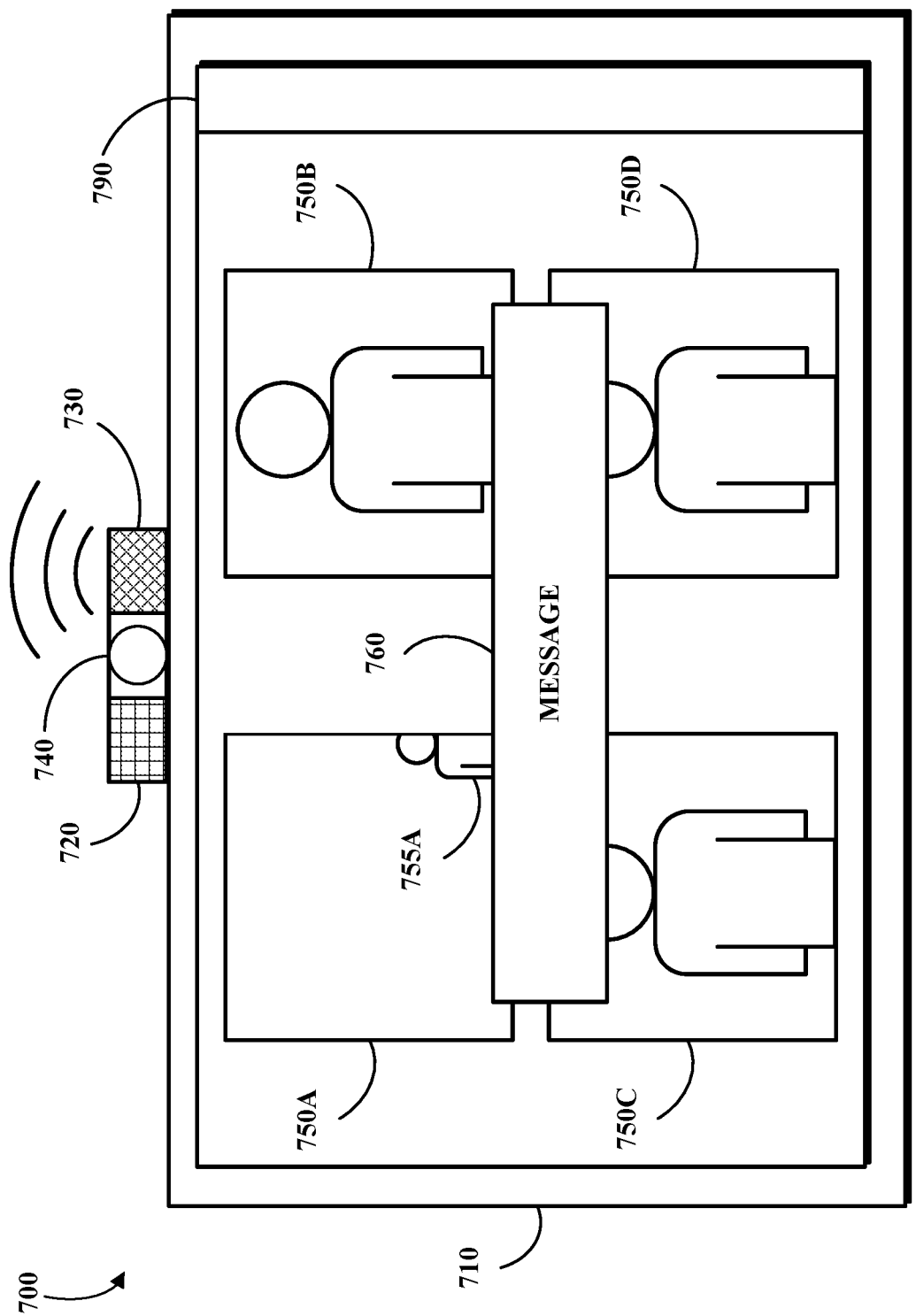
FIG. 7 is an illustration of another example of communications system associated with a participant device.

FIG. 7 is an illustration of another example of a communications system 700 associated with a participant device. The communications system 700 may be like the communications system 600 shown in FIG. 6. For example, the communications system 700 could belong to participant 755A shown in the user tile 750A. During a video conference, the audio output generated by the communications system 700 (e.g., microphone 720) could possibly decrease in quality. For example, participant 755A may move further away from the microphone 720 or change direction away from the microphone 720 (e.g., as indicated by a reduction in size and a change in location of participant 755A in user tile 750A as compared to other participants in other user tiles), or the microphone 720 may lose battery power. As a result, the quality associated with the participant's audio output may decrease. Accordingly, a computing device associated with the communications system 700 may execute a client application to detect that the quality associated with the audio output has decreased, to determine a change to the communications system 700 to increase the quality (e.g., increase the gain of the microphone 720 and/or switch to another microphone), and to apply the change to the communications system 700 to improve the quality. For example, a computing device associated with the communications system 700, like the computing device 506 shown in FIG. 5, may execute a client application like the client application 420A shown in FIG. 4.

In some implementations, the client application may provide an alert to the participant. For example, the client application may cause a message 760 to be displayed to the user interface 710 and/or cause a message to be played via the speaker 730. In some implementations, the message may indicate the determined change (e.g., a recommendation) to the participant without applying the change. For example, the message may indicate for participant 755A to move closer to the microphone 720. This may allow the participant 755A to manually make the change, approve the change before it is applied, and/or reject the change before it is applied. In some implementations, the client application may automatically apply the change at a predetermined time after providing the alert to the participant. For example, the client application may automatically increase the gain of the microphone 720. For example, the client application may automatically switch to a second microphone. In some implementations, the client application may automatically apply the change without providing any alert at all to the participant. For example, the client application may automatically increase the gain of the microphone 720 and/or switch to a second microphone without providing any alert at all to the participant (e.g., without displaying the message 760 and/or without playing the message via the speaker 730).

Figure 8:
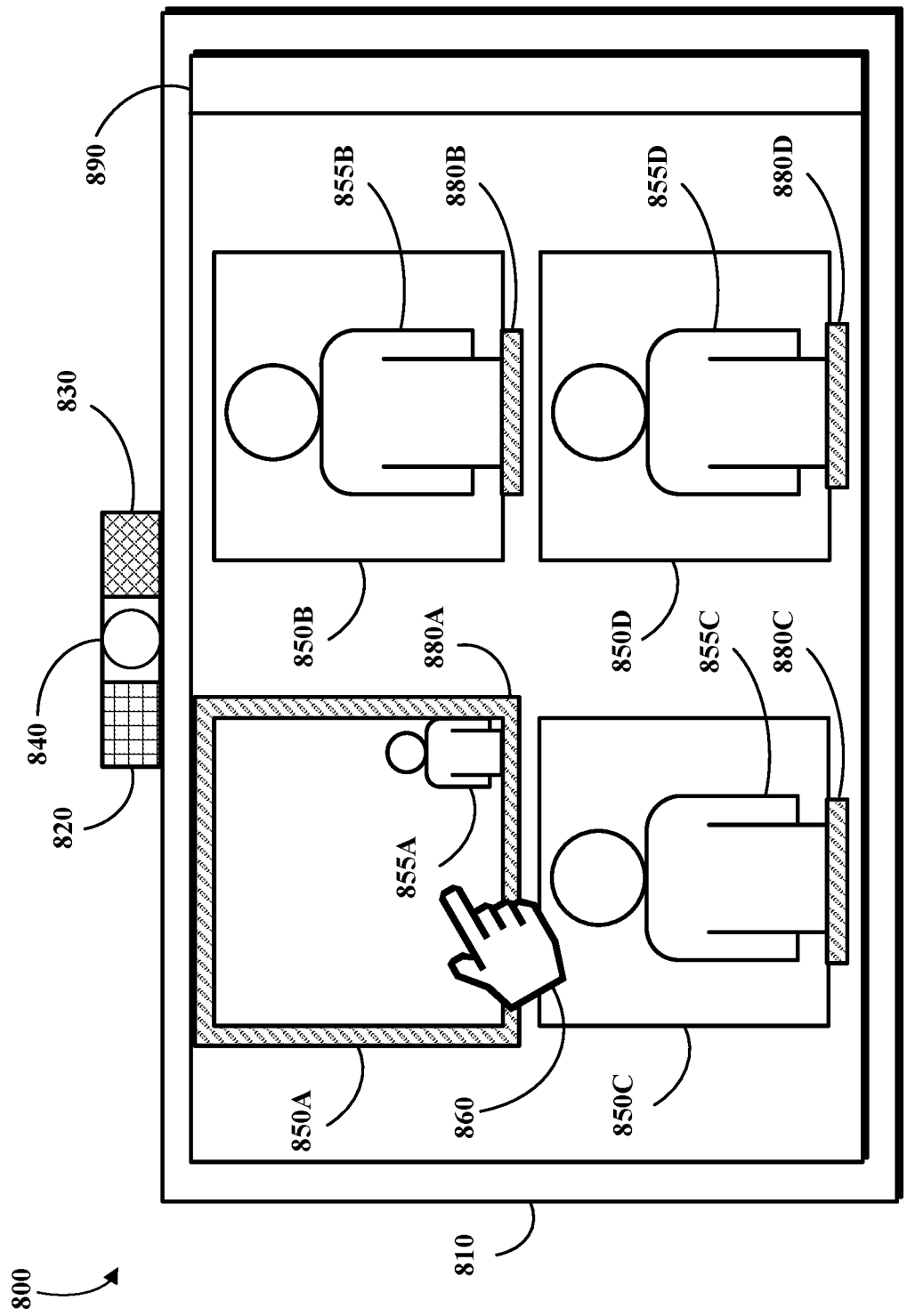
FIG. 8 is an illustration of another example of communications system associated with a participant device.

In some implementations, the client application may determine the change by using the camera 740 to detect an orientation of the participant and adjust and/or select a microphone based on their orientation. For example, the client application may determine that participant 755A has moved further away from the microphone 720, based on the orientation of participant 755A in the image. The client application may then determine a change based on their orientation, such as increasing the gain of the microphone 720 and/or selecting a second microphone that is closer to participant 755A. In some implementations, the client application may execute text to speech and/or speech to text software, including via the microphone 720, the speaker 730, and a text environment, such as a video conference chat box 790 shared with other participants or another messaging environment FIG. 8 is an illustration of another example of a communications system 800 associated with a participant device. The communications system 800 may be like the communications system 600 shown in FIG. 6. For example, the communications system 800 could belong to participant 855B shown in user tile 850B. During a video conference, the audio output generated by a communications system associated with another participant (e.g., a microphone associated with participant 855A shown in user tile 850A) could possibly decrease in quality. For example, participant 855A may move further away from their microphone or change direction away from their microphone (e.g., as indicated by a reduction in size and a change in location of participant 855A in user tile 850A as compared to other participants in other user tiles), or their microphone may lose battery power. As a result, the quality associated with that participant's audio output may decrease.

Accordingly, another participant, such as participant 855B, may provide input indicating that the quality associated with the other participant's audio output (e.g., participant 855A) has decreased. For example, the user interface 810 may display a prompt associated with participants of the video conference, such as prompts 880A through 880D. A participant (e.g., participant 855B) may use the prompt to select 860 a participant having decreased audio quality (e.g., use prompt 880A to select the participant 855A), such as via a mouse click, touch selection, or other input. Selecting a participant may cause the participant's user tile to be highlighted in the display, like the user tile 850A being highlighted by prompt 880A following selection of prompt 880A. Further, selecting a participant may cause an indication to be sent to that participant. For example, based on the selection (e.g., selection of user tile 850A via prompt 880A), a client application associated with the one participant device (e.g., belonging to participant 855B) may send an indication to a client application associated with another participant device (e.g., belonging to participant 855A). In turn, the client application associated with the other participant device (e.g., belonging to participant 855A) may detect the decrease in quality based on the input, may determine a change to increase the quality, and may apply the change, like the communications system 700 shown in FIG. 7. In some implementations, the client application may execute text to speech and/or speech to text software, including via the microphone 820, the speaker 830, and a text environment, such as a video conference chat box 890 shared with other participants or another messaging environment.

In some situations, it may be unclear to a participant (e.g., the participant 855B) as to whether the audio quality of another participant (e.g., the participant 855A) has decreased, or a quality associated with the participant's own communications system (e.g., the participant 855B) has decreased. Accordingly, in some implementations, participants may use prompts (e.g., the prompts 880A through 880D) to vote as to whether another participant's audio quality has decreased. For example, participant's 855B, 855C, and 855D may use prompts associated with participant 855A (e.g., the prompt 880A) to vote as to whether the audio quality associated with participant 855A has decreased. Based on voting for a given participant (e.g., selections of the user tile 850A via the prompt 880A by participants in separate user interfaces like the user interface 810), a client application associated with the given participant (e.g., the participant 855A) may detect the decrease in audio quality. For example, when multiple participants are present in a video conference (e.g., the participant 855A through 855D) and only one participant (e.g., the participant 855B) uses a prompt to indicate that the audio quality of another participant (e.g., the participant 855A) has decreased, a client application associated with the other participant (e.g., the participant 855A) might not detect this as a decrease in audio quality. When multiple participants in the video conference (e.g., the participants 855B and 855C) use a prompt to indicate that the audio quality of another participant (e.g., the participant 855A) has decreased, the client application associated with the other participant (e.g., the participant 855A) might then detect this as a decrease in audio quality. In some implementations, a threshold of votes (e.g., more than one vote, a majority of votes, unanimous votes, or the like) may be used to detect when a decrease in audio quality has occurred. In some implementations, a participant may vote by sending chat messages (e.g., via the video conference chat box 890) containing keywords that may be recognized by the client application. For example, a participant may vote by typing keywords indicating that another participant's audio quality has decreased. In some implementations, a participant may vote by verbalizing statements captured by a microphone (e.g., the microphone 820) containing keywords that may be recognized by the client application. For example, a participant may vote by stating keywords indicating that another participant's audio quality has decreased.

Figure 9:
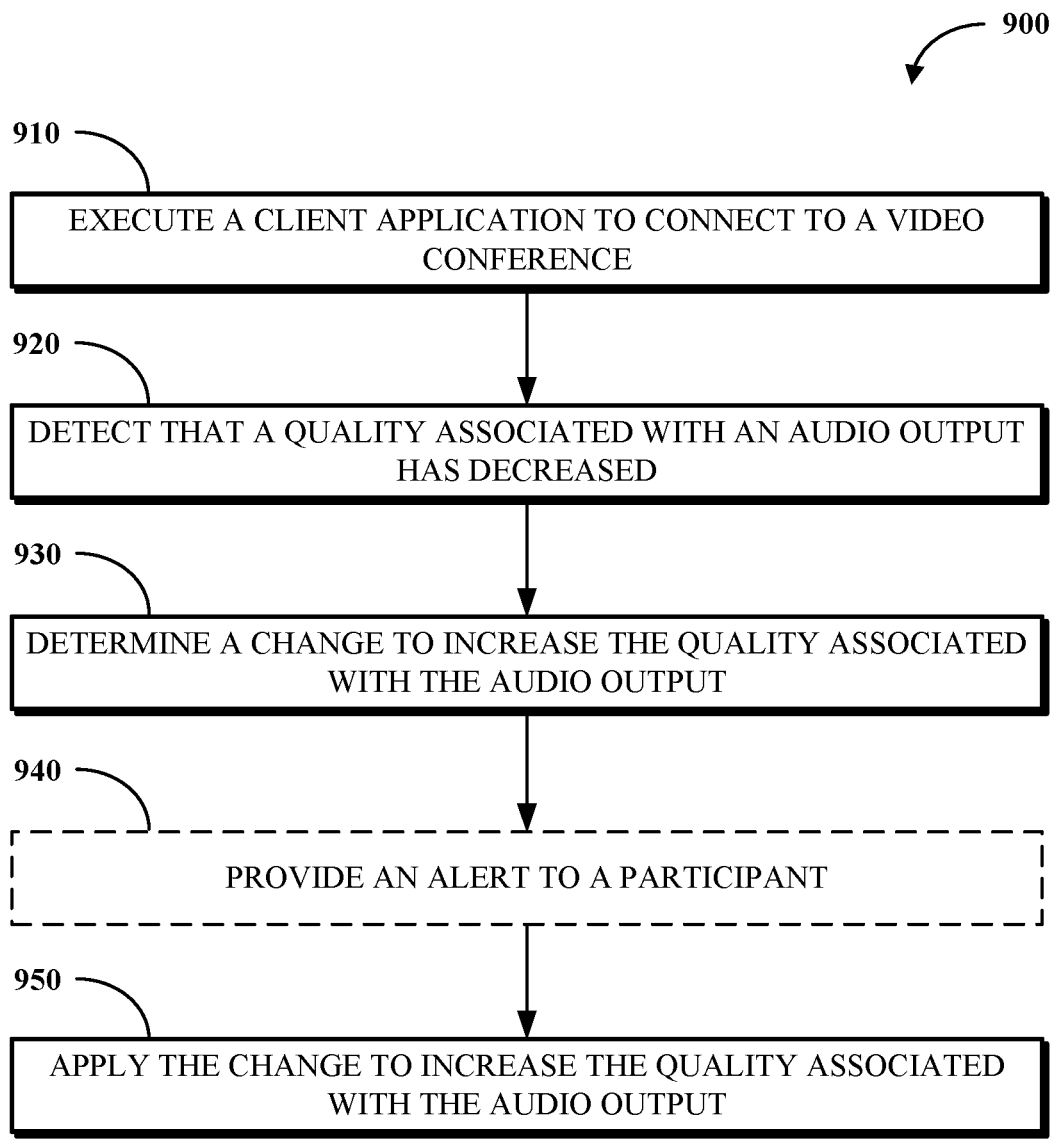
FIG. 9 is a flowchart of an example of a technique for increasing quality associated with an audio output during a video conference.

To further describe some implementations in greater detail, reference is next made to examples of techniques which may be performed by or using a system that increases quality associated with an audio output generated during a video conference. FIG. 9 is a flowchart of an example of a technique 900 for increasing quality associated with an audio output during a video conference. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 910, a participant device may execute a client application to connect to a video conference. The participant device may execute a client application like a client application shown in FIG. 4 (e.g., the client application 420A). The participant device may connect to a server to connect to the video conference, like the server device 440 shown in FIG. 4. The participant device may include a communications system like the communications system (e.g., the communications system 430A) shown in FIG. 4. The communications system may include one or more microphones, one or more cameras, one or more speakers, and/or one or more user interfaces.

At 920, the client application executing on the participant device may detect that a quality associated with an audio output of the participant device has decreased during the video conference. In some implementations, the client application may detect the decrease in quality by receiving an input sent by another participant device (e.g., receiving feedback). In some implementations, the client application may detect the decrease in quality by measuring the audio output of the communications system and comparing the measurement to a threshold (e.g., scoring). In some implementations, the client application may detect the decrease in quality by detecting that the participant's network connection is interrupted (e.g., between the participant device and a server device). In some implementations, the client application may detect that the quality has decreased by using a camera of the communications system to detect an orientation of the participant. In some implementations, the client application may use a machine learning model to detect that the quality has decreased.

At 930, responsive to detecting that the quality associated with the audio output has decreased, the client application executing on the participant device may determine a change to the communications system to increase the quality associated with the audio output. In some implementations, the client application may determine the change by measuring the audio output associated with individual microphones of the communications system and by selecting one or more microphones having audio outputs providing the best quality. In some implementations, the client application may determine the change by comparing the performance of the network (e.g., between the participant device and the server device) to one or more established models for network performance that have been empirically determined and selecting a network modality (e.g., Wi-Fi, Cellular, Dial In) that permits an audio outputs providing the best quality. In some implementations, the client application may determine the change by using a camera of the communications system to detect an orientation of the participant and determining whether to adjust and/or select a microphone based on the orientation of the participant (e.g., increasing a gain of a microphone that has become further away from the participant and/or selecting a microphone that has become closer to the participant as determined from a location of the participant in an image of the video output). In some implementations, the client application may use a machine learning model (e.g., trained to recommend changes which increase audio quality for participant devices, such as based on the manner by which the audio quality decreased) to determine the change, including for measuring one or more microphones, determining whether to adjust gains of one or more microphones, and/or determining whether to select between one or more microphones. In some implementations, the client application may determine the change to include invoking text to speech and/or speech to text software.

At 940, the client application executing on the participant device may provide an alert to the participant indicating that the quality associated with the audio output has decreased. In some implementations, the client application may cause a message to be displayed to a user interface and/or cause a message to be played via a speaker. In some implementations, the message may indicate the determined change (e.g., a recommendation) to the participant without applying the change. This may allow the participant to manually make the change, approve the change before it is applied, and/or reject the change before it is applied. In some implementations, the client application might not provide an alert at all (e.g., bypass 940), such as to reduce distraction to the participant by automatically applying changes to improve the audio output.

At 950, the client application executing on the participant device may apply the change to the communications system to increase the quality associated with the audio output. In some implementations, the client application may apply the change by adjusting a gain associated with one or more microphones of the communications system and/or switching from one or more microphones to one or more other microphones of the communications system. For example, the client application may increase the gain associated with one or more microphones. For example, the client application may switch from one or more microphones to one or more other microphones.

Figure 10:
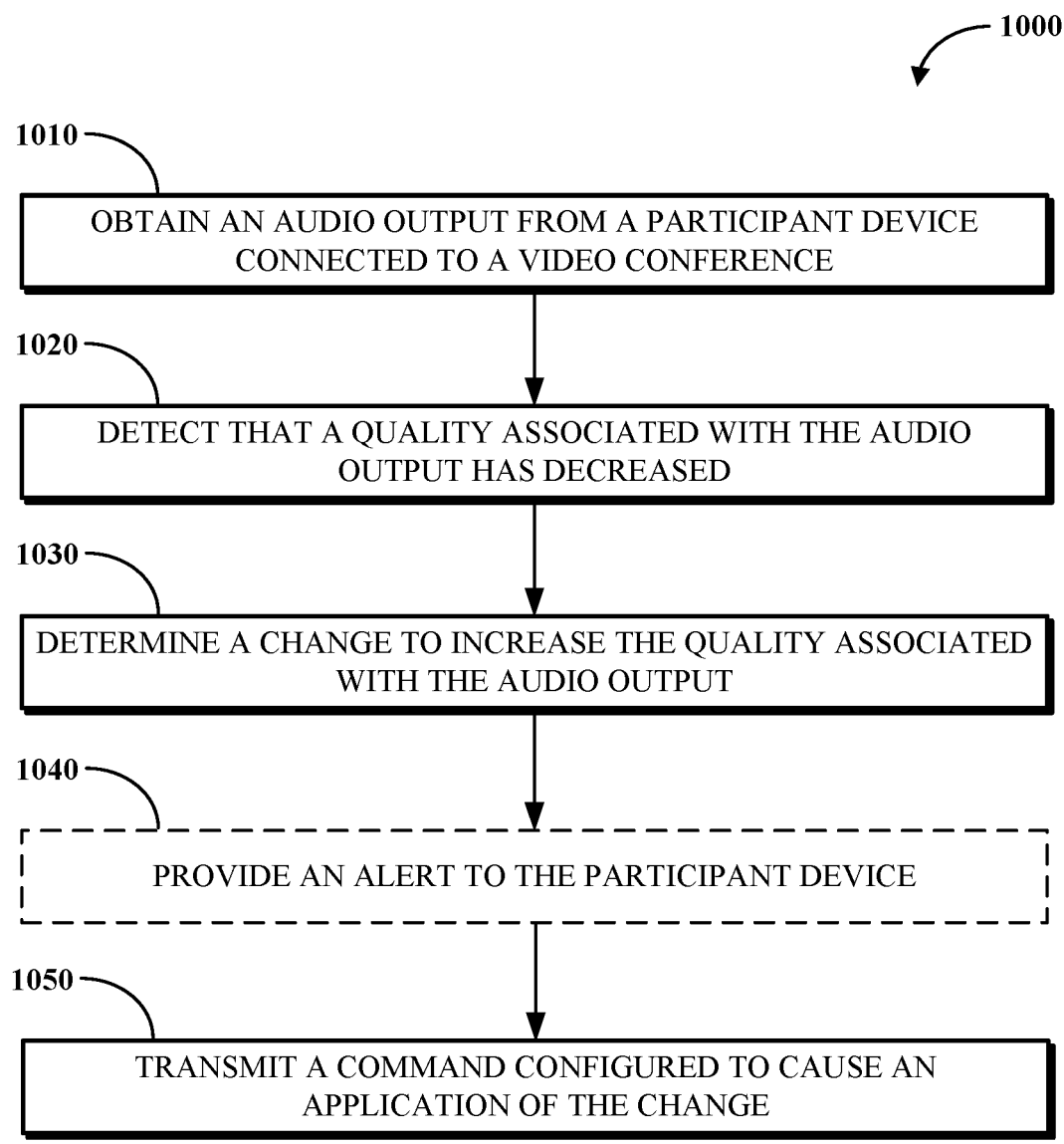
FIG. 10 is a flowchart of another example of a technique for increasing quality associated with an audio output during a video conference.

FIG. 10 is a flowchart of another example of a technique 1000 for increasing quality associated with an audio output during a video conference. At 1010, a server may obtain an audio output from a participant device connected to a video conference. The server may be like the server device 440 shown in FIG. 4. The participant device may include a communications system like a communications system shown in FIG. 4 (e.g., the communications system 430A). The communications system may include one or more microphones, one or more cameras, one or more speakers, and/or one or more user interfaces.

At 1020, the server may detect that a quality associated with the audio output of the participant device has decreased during the video conference. In some implementations, the server may detect the decrease in quality by receiving an input sent by another participant device (e.g., receiving feedback). In some implementations, the server may detect the decrease in quality by measuring the audio output of the communications system and comparing the measurement to a threshold (e.g., scoring). In some implementations, the server may detect the decrease in quality by detecting that the participant's network connection is interrupted (e.g., between the participant device and the server device). In some implementations, the server may detect that the quality has decreased by using a camera of the communications system to detect an orientation of the participant. In some implementations, the server may use a machine learning model to detect that the quality has decreased.

At 1030, responsive to detecting that the quality associated with the audio output has decreased, the server may determine a change to the communications system to increase the quality associated with the audio output. In some implementations, the server may determine the change by measuring the audio output associated with individual microphones of the communications system and by selecting one or more microphones having audio outputs providing the best quality. In some implementations, the server may determine the change by comparing the performance of the network (e.g., between the participant device and the server device) to one or more established models for network performance that have been empirically determined and selecting a network modality (e.g., Wi-Fi, Cellular, Dial In) that permits an audio output providing the best quality. In some implementations, the server may determine the change by using a camera of the communications system to detect an orientation of the participant and determining whether to adjust and/or select a microphone based on the orientation of the participant (e.g., increasing a gain of a microphone that has become further away from the participant and/or selecting a microphone that has become closer to the participant as determined from a location of the participant in an image of the video output). In some implementations, the server may use a machine learning model (e.g., trained to recommend changes which increase audio quality for participant devices, such as based on the manner by which the audio quality decreased) to determine the change, including for measuring one or more microphones, determining whether to adjust gains of one or more microphones, and/or determining whether to select between one or more microphones. In some implementations, the server may determine the change to include invoking text to speech and/or speech to text software.

At 1040, the server may provide an alert to the participant indicating that the quality associated with the audio output has decreased. In some implementations, the server may cause a message to be displayed to a user interface of the participant device and/or cause a message to be played via a speaker of the participant device. In some implementations, the message may indicate the determined change (e.g., a recommendation) to the participant without applying the change. This may allow the participant to manually make the change, approve the change before it is applied, and/or reject the change before it is applied. In some implementations, the server might not provide an alert at all (e.g., bypass 1040), such as to reduce distraction to the participant by automatically applying changes to improve the audio output.

At 1050, the server transmits a command to the client application (e.g., instructions, data, or other information which can be processed by the client application) that is configured to cause the client application to apply the change to the communications system to increase the quality associated with the audio output. In some implementations, the client application may apply the change, based on the command, by adjusting a gain associated with one or more microphones of the communications system and/or switching from one or more microphones to one or more other microphones of the communications system. For example, the client application may increase the gain associated with one or more microphones. For example, the client application may switch from one or more microphones to one or more other microphones. In some implementations, the command may cause the client application to prompt a user thereof (e.g., a user of a participant device executing the client application) to accept the change before the command is processed by the client application and the change is applied. In some implementations, the command may be automatically applied by the client application upon receiving the command from the server.

Some implementations may include a method that includes detecting that a quality associated with an audio output has decreased during a video conference. The audio output may be generated by a communications system associated with a client application connected to the video conference. The communications system may include at least one microphone that generates the audio output and a camera that generates a video output. The method may include determining a change to the communications system to increase the quality associated with the audio output. The method may also include applying the change to the communications system. In some implementations, the method may include displaying a message indicating the change to a user interface associated with the client application. In some implementations, the communications system may further comprise a speaker, and the method may further include playing a message indicating the change via the speaker. In some implementations, the method may include providing an alert to a participant associated with the client application and applying the change after providing the alert. In some implementations, the method may include applying the change to the communications system without providing an alert to a participant associated with the client application. In some implementations, the method may include adjusting a gain associated with the at least one microphone. In some implementations, the at least one microphone may comprise first and second microphones, and the change may include adjusting a first gain associated with the first microphone and adjusting a second gain associated with the second microphone. In some implementations, the at least one microphone may comprise first and second microphones, and the change may include switching from the first microphone to the second microphone. In some implementations, the at least one microphone may comprise first and second microphones, and the change may include measuring the audio output generated by the first microphone and the audio output generated by the second microphone and selecting between the first microphone and the second microphone based on the measuring. In some implementations, the at least one microphone may include first and second microphones, and the method may further include determining the change by using the camera to detect an orientation of a participant associated with the client application and selecting between the first microphone and the second microphone based on the orientation. In some implementations, the client application may be a first client application, and the method may further include detecting, by the first client application, that the quality associated with the audio output has decreased by receiving an indication from a second client application connected to the video conference. In some implementations, the method may include displaying a prompt to a user interface associated with a second client application connected to the video conference, wherein the prompt permits a selection of a participant associated with the first client application, and sending an indication from the second client application to the first client application based on the selection, wherein the indication permits the first client application to detect that the quality associated with the audio output has decreased. In some implementations, the method may include detecting, by the client application, that the quality associated with the audio output has decreased by measuring the audio output. In some implementations, the change may include using a machine learning model to select between the first and second microphones.

Some implementations may include an apparatus that includes a communications system including at least one microphone configured to generate audio output and a camera configured to generate a video output; a memory; and a processor configured to execute instructions stored in the memory. The instructions may include instructions to: connect to a video conference; detect that a quality associated with an audio output has decreased during a video conference, wherein the audio output is generated by a communications system associated with a client application connected to the video conference; determine a change to the communications system to increase the quality associated with the audio output; and apply the change to the communications system. In some implementations, the apparatus may include a user interface, and the instructions may include instructions to display a message indicating the change to the user interface. In some implementations, the at least one microphone may comprise first and second microphones, and the instructions may include instructions to: determine the change by using the camera to detect an orientation of a participant associated with the communications system; and select between the first microphone and the second microphone based on the orientation.

Some implementations may include a non-transitory computer-readable storage device that includes program instructions. The program instructions may be executed by a processor that causes the processor to perform operations. The operations may include: detecting that a quality associated with an audio output has decreased during a video conference, wherein the audio output is generated by a communications system associated with a client application connected to the video conference, and wherein the communications system includes at least one microphone that generates the audio output and a camera that generates a video output; determining a change to the communications system to increase the quality associated with the audio output; and applying the change to the communications system. In some implementations, the operations may include displaying a message indicating the change to a user interface associated with the client application. In some implementations, the at least one microphone may comprise first and second microphones, and the operations may include determining the change by using a camera to detect an orientation of a participant associated with the communications system; and selecting between a first microphone and a second microphone based on the orientation.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting that a network latency meets a threshold;
   detecting, via a camera, that a participant has moved a threshold distance away from the camera;
   determining that a quality associated with an audio output has decreased during a video conference based on the detection that the network latency meets the threshold and the detection that the participant has moved the threshold distance away from the camera, wherein the audio output is generated by a communications system associated with a client application connected to the video conference, and wherein the communications system includes a first microphone and a second microphone that generates the audio output;
   determining a change to the communications system to increase the quality associated with the audio output; and
   applying the change to the communications system.

2. The method of claim 1, further comprising:
   displaying a message indicating the change to a user interface associated with the client application.

3. The method of claim 1, wherein the communications system further comprises a speaker, the method further comprising:
   playing a message indicating the change via a speaker.

4. The method of claim 1, further comprising:
   providing an alert to a participant associated with the client application; and
   applying the change after providing the alert.

5. The method of claim 1, further comprising:
   applying the change to the communications system without providing an alert to a participant associated with the client application.

6. The method of claim 1, wherein the change comprises:
   adjusting a gain associated with the first microphone or the second microphone.

7. The method of claim 1, wherein the change comprises:
   adjusting a first gain associated with the first microphone; and
   adjusting a second gain associated with the second microphone.

8. The method of claim 1, wherein the change comprises:
   switching from the first microphone to the second microphone.

9. The method of claim 1, wherein the change comprises:
   measuring the audio output generated by the first microphone and the audio output generated by the second microphone; and
   selecting between the first microphone and the second microphone based on the measuring.

10. The method of claim 1, wherein the change includes pausing the audio output.

11. The method of claim 1, wherein the client application is a first client application, and further comprising:
    detecting, by the first client application, that the quality associated with the audio output has decreased by receiving an indication from a second client application connected to the video conference.

12. The method of claim 1, wherein the client application is a first client application, and further comprising:
    displaying a prompt to a user interface associated with a second client application connected to the video conference, wherein the prompt permits a selection of a participant associated with the first client application; and
    sending an indication from the second client application to the first client application based on the selection, wherein the indication permits the first client application to detect that the quality associated with the audio output has decreased.

13. The method of claim 1, further comprising:
    detecting, by the client application, that the quality associated with the audio output has decreased by measuring the audio output.

14. The method of claim 1, wherein the change comprises:
    using a machine learning model to select between the first and second microphones.

15. An apparatus, comprising:
    a communications system including a first microphone and a second microphone configured to generate audio output and a camera configured to generate image data;
    a camera configured to detect that a participant has moved a threshold distance away from the camera;
    a memory; and
    a processor configured to execute instructions stored in the memory to:
    connect to a video conference;
    detect that a network latency meets a threshold;
    determine that a quality associated with the audio output has decreased during the video conference based on the detection that the network latency meets a threshold and a detection that the participant has moved the threshold distance away from the camera, wherein the audio output is generated by the communications system associated with a client application connected to the video conference;
    determine a change to the communications system to increase the quality associated with the audio output; and
    apply the change to the communications system.

16. The apparatus of claim 15, further comprising:
    a user interface, wherein the instructions include instructions to display a message indicating the change to the user interface.

17. The apparatus of claim 15, wherein the instructions include instructions to:
    select between the first microphone and the second microphone based on an orientation direction.

18. A non-transitory computer readable medium storing instructions operable to cause one or more processors to perform operations comprising:
    detecting that a network latency meets a threshold;
    detecting, via a camera, that a participant has moved a threshold distance away from the camera;
    determining that a quality associated with an audio output has decreased during a video conference based on the detection that the network latency meets the threshold and the detection that the participant has moved the threshold distance away from the camera, wherein the audio output is generated by a communications system associated with a client application connected to the video conference, and wherein the communications system includes a first microphone and a second microphone that generates the audio output;

determining a change to the communications system to increase the quality associated with the audio output; and applying the change to the communications system.

19. The non-transitory computer readable medium storing instructions of claim 18, the operations further comprising:

displaying a message indicating the change to a user interface associated with the client application.

20. The non-transitory computer readable medium storing instructions of claim 18, the operations further comprising:

adjusting a gain of a first microphone or a second microphone based on an orientation direction of a participant.

* * * * *